(12) United States Patent
McDevitt

(10) Patent No.: US 11,959,579 B2
(45) Date of Patent: Apr. 16, 2024

(54) SYSTEM AND METHOD FOR A PROCESS TO CREATE IMPROVED PIPING TO SUPRESS THE BUILD UP OF BIOLOGICAL ORGANISMS

(71) Applicant: John McDevitt, Clearwater, FL (US)

(72) Inventor: John McDevitt, Clearwater, FL (US)

( * ) Notice: Subject to any disclaimer, the term of this patent is extended or adjusted under 35 U.S.C. 154(b) by 0 days.

(21) Appl. No.: 17/929,745

(22) Filed: Sep. 5, 2022

(65) Prior Publication Data

US 2023/0092249 A1  Mar. 23, 2023

Related U.S. Application Data

(60) Provisional application No. 63/247,763, filed on Sep. 23, 2021.

(51) Int. Cl.
| | | |
|---|---|---|
| *F16L 9/14* | (2006.01) | |
| *F16L 9/147* | (2006.01) | |
| *F16L 58/08* | (2006.01) | |

(52) U.S. Cl.
CPC .............. *F16L 58/08* (2013.01); *F16L 9/147* (2013.01)

(58) Field of Classification Search
CPC ................................. F16L 58/08; F16L 9/147
USPC ................................................. 138/141, 146
See application file for complete search history.

(56) References Cited

U.S. PATENT DOCUMENTS

| | | | | |
|---|---|---|---|---|
| 4,817,259 A | * | 4/1989 | Hata ...................... | B21C 23/22 29/523 |
| 5,226,380 A | * | 7/1993 | Fischer .................. | E02D 31/06 138/146 |
| 5,393,568 A | * | 2/1995 | Valente ................... | C09D 5/38 427/407.1 |
| 5,827,524 A | * | 10/1998 | Hagiwara ............... | C08K 3/36 424/501 |
| 5,894,042 A | * | 4/1999 | Ferralli ................. | B05D 7/222 138/146 |
| 8,039,073 B2 | * | 10/2011 | Lahijani .............. | F16L 58/1036 428/34.7 |
| 8,522,585 B1 | * | 9/2013 | Pratt ....................... | B21B 45/00 424/617 |
| 2010/0000901 A1 | * | 1/2010 | Jupin ..................... | B65D 35/08 206/524.4 |

* cited by examiner

*Primary Examiner* — James F Hook

(57) ABSTRACT

A system and method for a process to prepare piping such that it has a reduced chance of having biological organisms developing or growing within it by the addition of a metal structure to at least a portion of the inner wall of the piping. The system utilizes a limited amount of metal on or close to the inside wall of the piping to retard or suppress the growth of biological organisms within the piping. The limited amount of metal inside the pipe does not materially interfere with the structural aspects or performance of the pipe, nor does it significantly increasing the material costs of the pipe, while providing a unique and novel improved anti-biologic organism performance. The system is suitable for residential or commercial use.

8 Claims, 3 Drawing Sheets

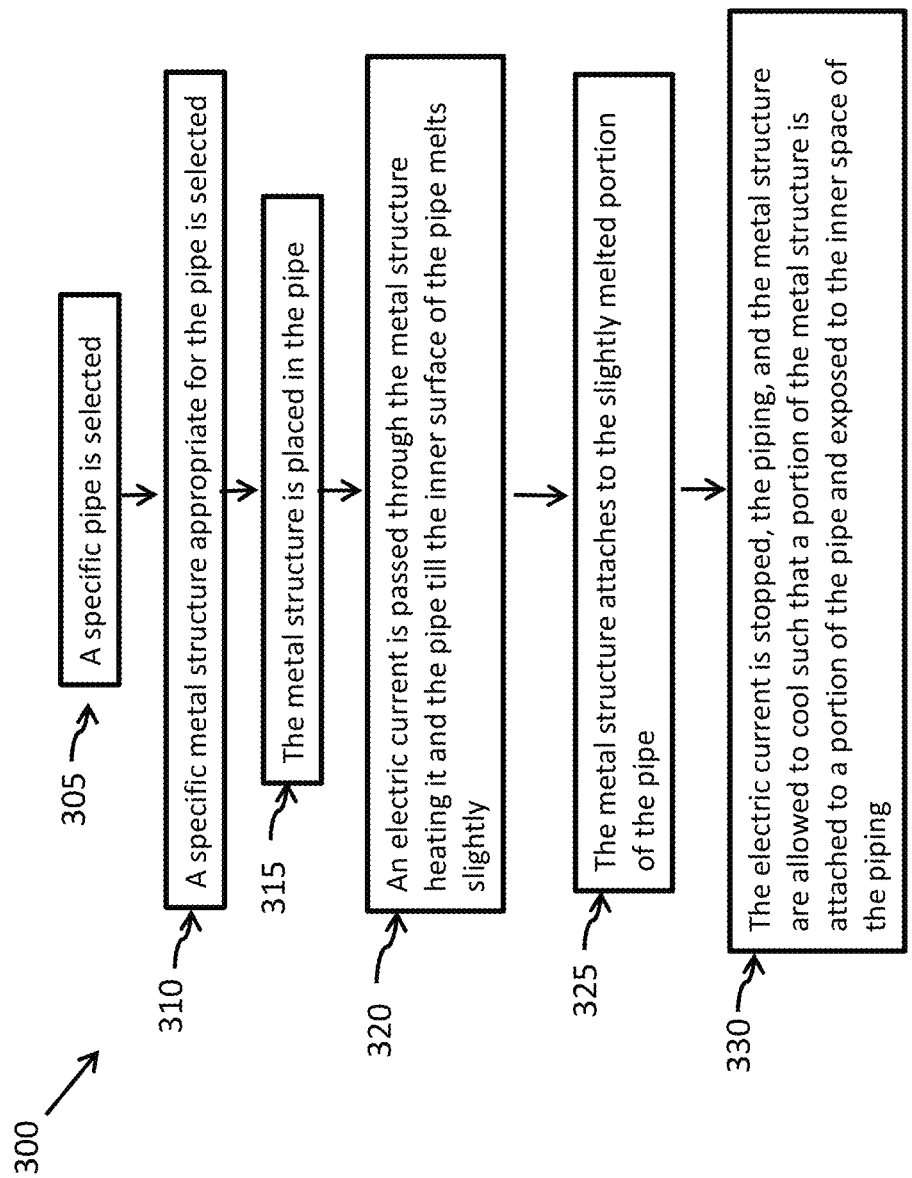

SYSTEM AND METHOD FOR A PROCESS TO CREATE IMPROVED PIPING TO SUPRESS THE BUILD UP OF BIOLOGICAL ORGANISMS

CROSS REFERENCE TO RELATED APPLICATIONS

This application claims priority to U.S. Provisional Patent Application No. 63/247,763 filed Sep. 23, 2021, the contents of which are incorporated by reference herein.

BACKGROUND OF THE INVENTION

There are a variety of existing pipes available for fluid and gas transport, in particular, plastic pipes (commonly including but not limited to PVC (polyvinyl chloride)) that are often used for drainage. One common drainage system is for water resulting from air conditioner condensation. Draining water from and air conditioner unit inside a home or other structure to outside of it. These pipes often have sections that run close to horizontal such that the water may not flow through them quickly or may have water that collects in them for a period of time. This wet, low-flow environment provides conditions supportive of the growth of biological organisms inside the pipe. The build-up of the biological organisms over time may in turn further slow the flow of water which may lead to even more organism growth, possibly significantly (or even completely) clogging the drainpipe. If the flow is significantly reduced in the drainage pipe it may lead to the condensation water draining inside the structure, rather than outside the structure as intended, leading to water damage of the surrounding area (often damaging the home or other structure).

PVC piping is most commonly used for such drainage systems due to a variety of reasons, including but not limited to its; the relatively low price, common availability, ease of working it (cutting and joining), chemical welding of joints (rather than heat and solder), durability, slight flexibility (without cracking or material dents), familiarity of use, and ease of use by professionals and amateurs, alike (amongst other reasons). However, unlike copper piping (which has natural anti-biologic qualities but is significantly more expensive and difficult to work with than PVC piping), PVC does not have anti-biologic qualities, and as such, runs the risk of building up biological material within the pipe that can retard the water flow through the pipe. Thus, there is the need for a piping product that combines the benefits of both PVC piping (or other similar piping) and copper piping (or other similar piping), without adding negative cost (e.g., higher cost) or performance (e.g., materially reduced flow, materially reduced ease of use, etc.) into a single superior piping solution.

SUMMARY OF THE INVENTION

Accordingly, an improved system and method of preparing piping is needed to allow individuals to enjoy the benefit of the advantages of both plastic and copper (or similar material) piping in one product. There is a need in the industry for a method and system that provides for creating piping with anti-biologic growth properties coupled with the advantages of plastic piping. Thus, allowing the consumer to enjoy an improved piping product without the undue burden and challenges of traditional copper piping. The present invention prevents the waste of a user's resources (especially time and money) and improves the user's overall piping installation and performance experience.

The system and method disclosed herein provides for a piping manufacturing or adaptation process to provide for the improved piping product that combines the advantages of plastic piping and the anti-biologic properties of metal piping. The product referred to herein as EZ Flow Piping (EZFP) will be described in more detail below but generally minimally consists of a plastic pipe that has an anti-biologic metallic element inside the pipe. The metallic element may be placed inside the pipe through a variety of means, in a variety of orientations, in a variety of configurations, and may consist of a variety of metals. Please note that while the disclosed system may be used for a variety of applications in a variety of types of piping (including but not limited to piping made from one or more of; plastic, rubber, glass, ceramic, metal, stone, etc.) the exemplary case described in detail herein is for plastic piping.

The terms "pipe", "piping", "tubes", and "tubing" are used generically and interchangeably throughout and may mean any piping structure (flexible, semi-flexible, or rigid) that substances (including but not limited to fluids, gasses, solids, semi-solids, slurries, suspensions, or a combination of these) may pass through. These piping structures may be in any three-dimensional shape that has a minimum of two spaces that substances may pass through and have a topological nature with what would commonly be referred to as an inside and an outside. While the piping referred to in this present invention may be constructed of any substance, but in the exemplary embodiment the piping is plastic (e.g., PVC (polyvinyl chloride), PEX (cross-linked polyethylene), ABS (acrylonitrile butadiene styrene), HDPE (High-density polyethylene), uPVC (unplasticized polyvinyl chloride), CPVC (post chlorinated polyvinyl chloride), PB-1 (polybutylene), PP (polypropylene), PE (polyethylene), PVDF (polyvinylidene fluoride), PE RT (polyethylene RT), EVA (Ethyl Vinyl Acetate), Nylon (polyamide), Polyketones (PEEK, PEK, PEKK), Polypropylene (PP), Polyurethane (PU), or other similar materials). Furthermore, "user", "consumer", "individual", or other similar terms are used interchangeably, generically, and could mean any user of EZFP and the user could be a human individual, a group of humans, an animal or animals, another system, or set of systems.

In the given invention the biological organisms referred to herein, include but are not limited to mold, mildew, algae, fungus, microbes, bacteria, viruses, organic matter, or any other similar organic items. Also, the terms "anti-biologic", "anti-biological", "biocidal" and other similar terms are used generically and interchangeably and generally mean the retardation, killing, deterring, suppressing, destroying, reducing, rendering harmless, interruption of reproduction, interruption of growth, inhibiting the growth of, preventing the growth of, or other similar stopping of biological organisms. Additionally, in the given invention a variety of metals may have a biocidal effect and may be used for their chemical ability to retard the growth, and or propagation of organic organisms. The term metal is used generically and may mean elemental Alkali Metals, Alkaline Earth Metals, Transition Metals, Metalloids, Other Metals, Rare Earth Elements, any given combination of these, or any combination/mixture containing one or more of these. These elemental metals may include but are not limited to, V (vanadium), Ti (titanium), Cr (chromium), Co (cobalt), Ni (nickel), Cu (copper), Zn (zinc), Tb (terbium), W (tungsten), Ag (silver), Cd (cadmium), Au (gold), Hg (mercury), Al (aluminum), Ga (gallium), Ge (germanium), As (arsenic), Se (selenium), Sn (tin), Sb (antimony), Te (tellurium), Pb (lead), Bi (bismuth), Fe (iron), In (indium), Ti (thallium), Mn (manganese), Mg (magnesium), Pt (platinum), brass, or bronze each in a pure, ionic, alloy or mixture state. The term metal structure is also used generically and may mean any three-dimensional configuration that contains metal. The metal structure may contain in addition to metal other substances that may among other things help adhere the metal structure to the piping, or maintain the structure of the metal structure, or help facilitate applying the metal structure to the piping.

In alternative embodiments, the piping may not only apply to household environments. The described system and method may also apply to (indoor or outdoor or mixed) multi-dwelling, educational, commercial, industrial, military, medical, research, laboratory, scientific, or other similar environments where the EZFP may be applied in order to create an improved outcome. In these non-home applications aspects such as, but not limited to; the scale, the precision, or the accuracy of parameters related to settings such as amount, positioning, type(s) of metals used, etc. may be outside those of common home use.

The given invention provides a system for retarding the growth of biological organisms in piping may be achieved by means of adding a metal structure to the piping. The piping which in an example embodiment may be plastic, allows a substance (which may be in addition to other things a liquid or a gas) to pass through it. At least one metal structure made with a metal that has a biocidal property (which may be in this example copper) is attached to or positioned near at least a part of the inner wall of the piping such that at least a portion of the metal structure and is positioned such that at least a portion of the metal structure is exposed to the inner area of the piping such that at least a portion of the substance passing through the pipe may come in contact with the metal structure.

Additionally, the given invention provides a method for retarding the growth of biological organisms in piping by means of attaching a biocidal metal structure in the piping, by means of: 1) choosing a piece of piping that a substance may pass through; 2) choosing a metal structure of an appropriate size, shape, and material appropriate for the piping; 3) placing the metal structure in at least a portion of the piping; 4) attaching or positioning at least a portion of the metal structure to or near at least a portion of the inner wall of the piping; 5) the metal structure is attached or positioned such that at least a portion of the metal structure is exposed to the inner area of the piping; 6) and at least a portion of the metal structure may be exposed to at least a portion of the substance passing through the piping.

BRIEF DESCRIPTION OF THE DRAWINGS

FIG. 3 illustrates a flowchart for methods of preparing EZFP by means of utilizing piping and a metal structure in accordance with an exemplary embodiment.

DETAILED DESCRIPTION

Figure 1:
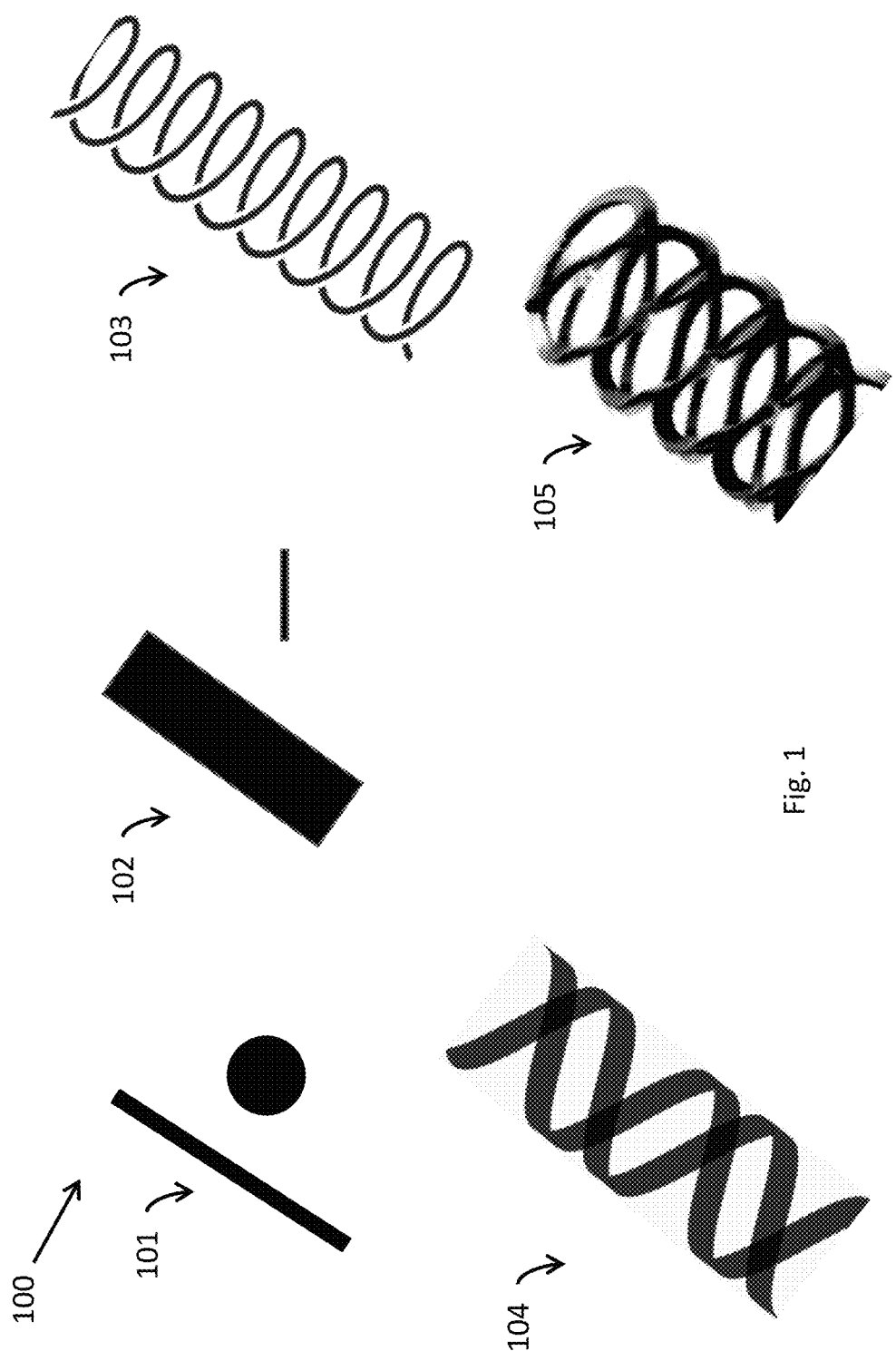
FIG. 1 illustrates line drawing examples of the EZFP metal structure in accordance with an exemplary embodiment.

The following detailed description outlines possible embodiments of the proposed system and method disclosed herein for exemplary purposes. The system and method disclosed are in no way meant to be limited to any specific combination of piping and metal structure. A person skilled in the relevant art will recognize that other configurations and components may be utilized without departing from the scope of the disclosure. As will be described below, the system and method disclosed herein relate to the EZFP. Exemplary embodiments of the metal structures utilized in the EZFP are illustrated in FIG. 1, which includes the structures described below. It should be appreciated that each of the structures are illustrated as simple line drawing diagrams, but include the requisite approximate shapes needed to perform the specified functions as would be appreciated by one skilled in the art. However, relative scale, precise shapes, and relative dimensions are just for example purposes and are not intended to limit the scope of the disclosed invention.

For example, but not limitation, FIG. 1 is a set of basic explanatory representations in the form of line drawings of possible structures of the metal structure of the EZFP. In this exemplary embodiment of the metal structure (101) is in the general shape of round wire where the cross section of the metal is generally in the shape of a circle. The metal structure (102) is in the general shape of a ribbon where the relative proportion of the width to the height of the cross section of the metal is such that the width is more than the height. The metal structure (103) is a helix (or corkscrew) shape such that the distance of the metal itself from a central axis is relatively consistent. The metal itself may be round, ribbon or other shaped. The metal structure (104) is a double helix shape such that the distance of the metal from a central axis is relatively consistent and the two helix structures are relatively parallel to each other. The metal itself may be round, ribbon or other shaped. Additionally, in alternative embodiments there may be more than two relatively parallel helix structures. The metal structure (105) is a double helix shape such that the distance of the metal from a central axis is relatively consistent and the two helix structures intersect with each other. The metal itself may be round, ribbon or other shaped. Additionally, in alternative embodiments there may be more than two parallel or intersecting helix structures (or a structure with a combination of parallel or intersecting helixes). Furthermore, there may be alternate embodiments which may be a combination of one or more of the aforementioned embodiments, or different metal structures. Each of these structures (or combinations of them) may be utilized more than one time in a given pipe or may be of a size or density that up to the entire inner wall of the pipe is covered with the metal structure. Additionally, different metals may be used for different portions of the metal structure. Also, different metal structures (including different metal structure shapes and metal substances) may be used in a system utilizing multiple piping sections.

Figure 2:
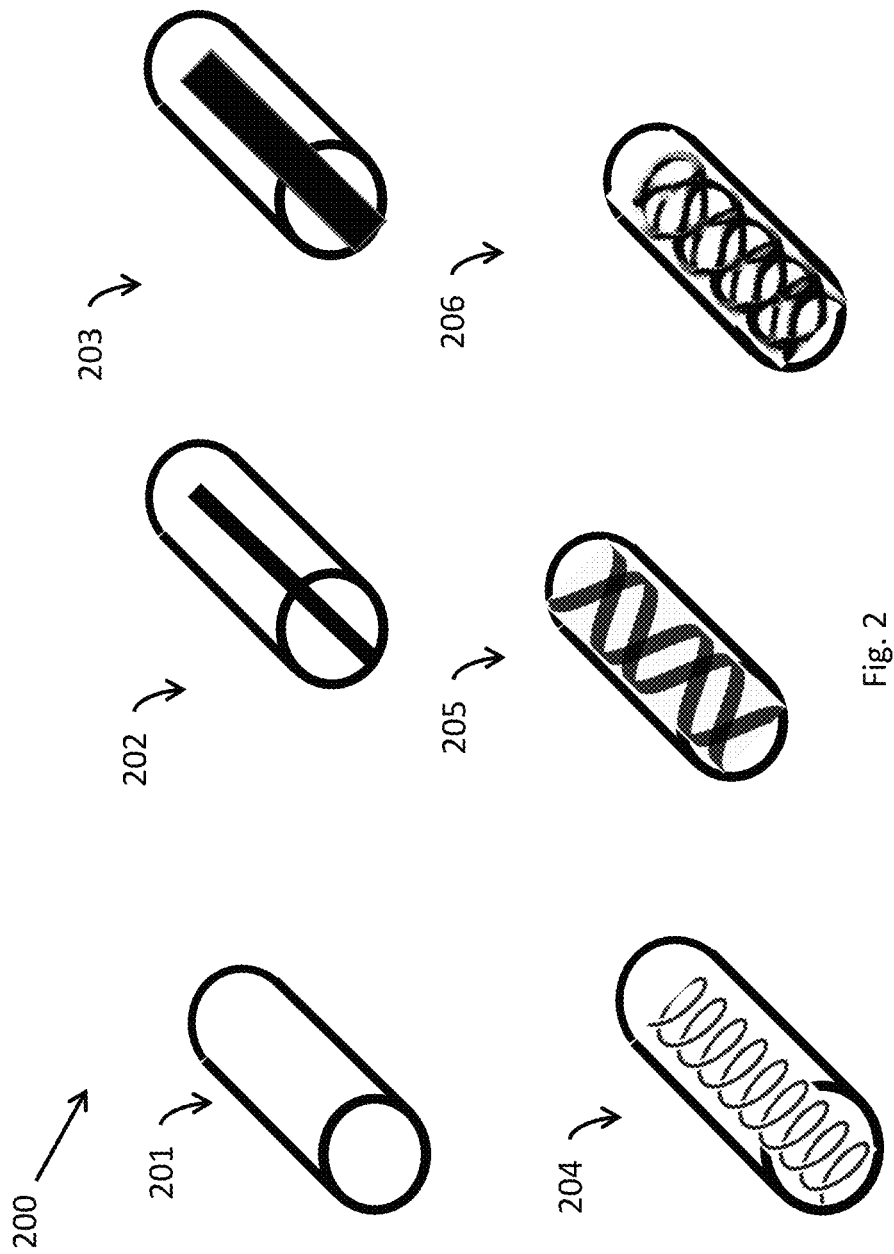
FIG. 2 illustrates line drawing examples of the EZFP with metal structure in accordance with an exemplary embodiment.

For example, but not limitation, FIG. 2 is a set of basic explanatory representations in the forms of line drawings of a pipe and the EZFP with examples of piping with the aforementioned embodiments of the metal structure contained within it. It should be noted that the given example is a semi-transparent circular pipe, but the example is for ease of viewing and not a limitation as to the nature of the piping that may occur in alternative embodiments of the EZFP. (201) is a general example of an exemplary section of pipe prior to the addition of the metal structure to create EZFP. An exemplary embodiment of the metal structure (202) is in the general shape of round wire where the cross section of the metal is generally in the shape of a circle and the metal is positioned on the inner surface of the piping. The metal structure (203) is in the general shape of a ribbon there the relative proportion of the width to the height of the cross section of the metal is such that the width is more than the height and the metal structure is positioned on the inner surface of the piping. The metal structure (204) is a helix (or corkscrew) shape such that the distance of the metal itself from a central axis is relatively consistent. The metal itself may be round, ribbon or other shaped and the metal structure is positioned on the inner surface of the piping. The metal structure (205) is a double helix shape such that the distance of the metal itself from a central axis is relatively consistent and the two helix structures that are relatively parallel to each other. The metal itself may be round, ribbon or other shaped and the metal structure is positioned on the inner surface of the piping. Additionally, in alternative embodiments there may be more than two relatively parallel helix structures. The metal structure (206) is a double helix shape such that the distance of the metal itself from a central axis is relatively consistent and the two helix structures intersect with each other. The metal itself may be round, ribbon or other shaped and the metal structure is positioned on the inner surface of the piping. Additionally, in alternative embodiments there may be more than two intersecting helix structures (or a structure with a combination of parallel or intersecting helixes). Furthermore, there may be alternate embodiments which may be multiples of individual types of metal structures a combination of one or more of the aforementioned embodiments or alternative structures. It should also be noted that while the illustrations are of straight sections of piping, that is just as an example not a limitation and the piping for EZFP may be of any shape.

Alternatively, in alternate embodiments the metal structures may be positioned such they are inside the body of the piping but not positioned on the inner surface of the piping. Also, the metal structure may be attached to the inner surface of the piping, or integrated into the inner surface of the piping (with a portion of the metal structure exposed to the inside space of the piping), or a combination of any or all of these. Furthermore, the metal structure may be shorter, longer, or equal to the length of the piping (e.g., the metal structure may only be in a portion of the piping, may extend beyond the piping, or may be the same length as the piping).

For example, but not limitation, there are a variety of ways the metal structure may be placed within piping to create the EZFP. The metal structure may be unattached to the piping, attached to the piping, or a combination of the two. The attachment of the metal structure may be achieved through a variety of exemplary means, including but not limited to, fusing to the surface of the piping, integrated into the piping itself, pressed against the inner wall of the piping by means of the structure pressing against the inner wall, or a combination of any of these.

The fusing of the metal structure to the inner surface may be achieved by means of a variety of approaches. For example, but not limitation, the fusing may be achieved through chemical bonding of the metal structure to the inner wall of the piping (e.g., gluing), or it may be achieved through partially melting though chemical means, or thermal means (e.g., a substance that partially melts the inner surface of the piping, or passing electricity through the metal structure to heat the piping, or friction of the metal structure against the inner surface of the piping pressing the metal structure against the inner wall heating the piping, or applying a heat source to the piping in the area where the metal structure is to be placed) and when the inner wall of the piping re-solidifies (or semi-solidifies) the metal structure is attached or partially attached to the inner wall of the piping.

The metal structure may be painted or sprayed onto the inside of the piping (as example the metal may be mixed with an adhesive to stick to the inside of the piping, or the metal may be a hot powder that is applied to the inside of the pipe and is fused to the inside of the pipe). Also, the metal structure may be introduced into the piping material in the piping forming process such that as the piping is constructed the metal structure is integrated into the piping such that a portion of the metal structure is exposed through the inner wall of the piping. Alternately, the metal structure may just be constructed to fit within specific piping dimensions such that the metal structure is kept relatively in the same place within the piping by means of contact with at least a portion of the inner wall of the piping. Furthermore, the physical structure of the metal may be constructed in such a way that it may press outward from its central axis such that it pushes out against the inner wall of the piping, keeping it relatively in place. Furthermore, an alternative approach there the metal structure is small pieces of metal that are mixed with the pipe plastic in the pipe forming process (e.g., when the plastic has not yet hardened) and the small metal structures are integrated into the pipe substance itself. Also, A combination of these approaches may be used.

FIG. 3 illustrates a flowchart for a method according to an exemplary first embodiment. The EZFP may follow multiple alternative approaches, but an exemplary embodiment generically follows the following steps: (305) a pipe of a specific size, shape, and material is chosen for the given application (201) (e.g., in this embodiment a 2 centimeter in inner diameter round, 1-meter-long piece of PVC piping is selected). Then (310) a metal structure of a specific, size, shape, and material is chosen to accompany the example plain PVC piping (201) for the given application (e.g., in this embodiment a 2 millimeter in diameter round, 1.05-meter-long piece of copper wire is selected). Then (315) the metal structure (101) is passed through the given pipe (201) (this can be achieved by a variety of means of pushing or pulling (or a combination of these) the metal structure through the pipe (201)) such that each end of the metal structure (101) is slightly beyond each end of the pipe (201) and the metal structure (101) is slightly pulled against the inner wall of the pipe (201). Then (320) the metal structure (101) is attached to an electricity source and an electric current is passed through the metal structure (101), such that the metal structure (101) gets hot enough to slightly melt the inner wall of the pipe (201) in the area that the metal structure (101) is in contact with. Then (325) the slight pressure of the metal structure against the now slightly melted inner wall of the pipe (201) allows the metal structure (101) to attach (fuse) to the inner wall of the pipe (201). At this point (330) the electric current is stopped, and the metal structure (101) and the pipe (201) are allowed to cool. The resulting is that at least a portion of the metal structure is attached to at least a part of the pipe and at least a portion of the metal structure is exposed to the inner space of the pipe. Now, this combination of metal structure (101) and piping (201) is an example of EZFP (202).

An alternate example embodiment utilizing metal structures such as a helix (103), a double helix (104), an intersecting helix set (105) or other similar such structure may be used in situations to modify existing piping that is already in place being used. These basic physical shapes (as well as other shapes) of the metal structure have the advantage that it allows the metal structure to generally maintain its shape outside of piping and as such may be added to piping that is already installed at a location or previously purchased plain piping. The metal structure may be added by a variety of means including but not limited to "threading" or "screwing" or "pushing" or "pulling" the metal structure into piping. A variety of means (including but not limited to the aforementioned methods) may be used to keep the metal structure in place in the piping, thus creating EZFP. It should again be noted that the metal structure may not necessarily run the full length of the piping to still create EZFP.

In the interest of clarity, not all of the routine features of the aspects are disclosed herein. It will be appreciated that in the development of any actual implementation of the present disclosure, numerous implementation-specific decisions must be made in order to achieve the developer's specific goals, and that these specific goals will vary for different implementations and different developers. It will be appreciated that such a development effort might be complex and time-consuming but would nevertheless be a routine undertaking of engineering for those of ordinary skill in the art having the benefit of this disclosure.

Furthermore, it is to be understood that the phraseology or terminology used herein is for the purpose of description and not of restriction, such that the terminology or phraseology of the present specification is to be interpreted by the skilled in the art in light of the teachings and guidance presented herein, in combination with the knowledge of the skilled in the relevant art(s). Moreover, it is not intended for any term in the specification or claims to be ascribed an uncommon or special meaning unless explicitly set forth as such.

It is noted that terms "compromises," "comprising," "includes," "including," "has," "having" or any other variation thereof, are intended to cover a non-exclusive inclusion. For example, a process, system, method, article, or apparatus that comprises a list of elements is not necessarily limited to only those elements but may include other elements not expressly listed or inherent to such processes, systems methods, articles, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

Furthermore, as used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Upon reading this disclosure, those of skill in the art will appreciate still additional alternative systematic and functional designs. Thus, while particular embodiments and applications have been illustrated and described herein, it is to be understood that the disclosed embodiments are not limited to the precise construction and components disclosed herein. Various modifications, changes, and variations, which will be apparent to those skilled in the art, may be made in the arrangement, operation, and details of the system and method disclosed herein without departing from the spirit and scope defined in the claims.

The various aspects disclosed herein encompass present and future known equivalents to the known modules referred to herein by way of illustration. Moreover, while aspects and applications have been shown and described, it would be apparent to those skilled in the art having the benefit of this disclosure that many more modifications than mentioned above are possible without departing from the inventive concepts disclosed herein.

What is claimed is:

1. A system for retarding the growth of biological organisms in a pipe by adding a metal structure to the pipe comprising:
    at least one pipe that allows a substance to pass through it;
    at least one metal structure made with a metal that has a biocidal property;
    the at least one metal structure is at least of equal length as the at least one pipe;
    the at least one metal structure can support passing an electric current;
    the at least one metal structure becomes hot enough to fuse to the inner wall of the at least one pipe when an electric current is passed through the at least one metal structure; and
    at least a portion of the at least one metal structure fused to the inner wall of the at least one pipe is positioned such that at least a portion of the at least one metal structure is exposed to the inner area of the at least one pipe such that at least a portion of the substance passing through the at least one pipe may come in contact with at least a portion of the at least one metal structure.

2. The system according to claim 1, wherein the substance to pass through the pipe is a liquid.

3. The system according to claim 1, wherein the piping material is plastic.

4. The system according to claim 1, wherein the metal structure is made of copper.

5. A method for retarding the growth of biological organisms in piping by attaching a biocidal metal structure in the piping, by:
    choosing a piece of piping that a substance may pass through;
    choosing a metal structure of at least an equal length as the piping;
    placing the metal structure in at least a portion of the piping;
    passing an electric current through the metal structure such that the metal structure gets hot enough to fuse at least a portion of the metal structure to at least a portion of the inner wall of the piping;
    the metal structure is attached to the piping such that at least a portion of the metal structure is exposed to the inner area of the piping and at least a portion of the metal structure may be exposed to at least a portion of the substance passing through the piping.

6. The method according to claim 5, wherein the substance to pass through the pipe is a liquid.

7. The method according to claim 5, wherein the piping material is plastic.

8. The method according to claim 5, wherein the metal structure is made of copper.

* * * * *